(12) United States Patent  
Lucas et al.

(10) Patent No.: US 7,416,571 B2
(45) Date of Patent: Aug. 26, 2008

(54) COMPACT MIXER FOR THE MIXING OF GASEOUS HYDROCARBON AND GASEOUS OXIDANTS

(75) Inventors: Jamie D. Lucas, Stillwater, OK (US); Guy H. Lewis, Ponca City, OK (US); Harold A. Wright, Ponca City, OK (US); Dale R. McIntyre, Ponca City, OK (US); David M. Minahan, Stillwater, OK (US); David H. Anderson, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 587 days.

(21) Appl. No.: 11/076,286

(22) Filed: Mar. 9, 2005

(65) Prior Publication Data

US 2006/0201065 A1    Sep. 14, 2006

(51) Int. Cl.
*C01B 3/24* (2006.01)
*G05D 7/00* (2006.01)
*B01J 10/00* (2006.01)

(52) U.S. Cl. .................. 48/198.1; 422/110; 422/111; 422/188; 422/189; 422/196; 422/197

(58) Field of Classification Search ............... 422/110, 422/111, 188, 189, 190, 196, 197, 117, 129, 422/224, 220; 48/198.1
See application file for complete search history.

(56) References Cited

U.S. PATENT DOCUMENTS

| | | | |
|---|---|---|---|
| 536,945 | A | 4/1895 | Avery |
| 1,039,036 | A | 9/1912 | Dunham |
| 1,312,147 | A * | 8/1919 | Wallwin ................ 239/427 |
| 1,564,363 | A | 12/1925 | Miller |
| 1,973,712 | A | 9/1934 | Justheim |
| 2,054,601 | A | 9/1936 | Jenkins |
| 2,102,152 | A | 12/1937 | Hays |
| 2,195,227 | A | 3/1940 | Sachsse |
| 2,405,465 | A | 8/1946 | Summerfield |
| 2,630,461 | A | 3/1953 | Sachsse et al. |
| 2,790,838 | A | 4/1957 | Schrader |
| 2,843,592 | A | 7/1958 | Ludwig et al. |
| 3,473,323 | A | 10/1969 | Briggs et al. |

(Continued)

FOREIGN PATENT DOCUMENTS

EP    0 303 438    2/1987

(Continued)

*Primary Examiner*—Walter D. Griffin
*Assistant Examiner*—Huy-Tram Nguyen
(74) *Attorney, Agent, or Firm*—Conley Rose P.C.

(57) ABSTRACT

Embodiments include methods and apparatus for mixing feedgases and producing synthesis gas. The apparatus includes a vessel containing a mixing system comprising one or more channels and a reaction zone downstream of the mixing system. A first feedgas and a second feedgas are separately injected into different injection portions of each channel, such that the second feedgas is injected in an acute direction into the first feedgas flowstream. The injected feedgases thereafter mix in a mixing portion of the channel. The mixing portion of each channel may have a reduced cross-sectional area so as to increase the total velocity of the feedgases while they mix. A feedgas mixture exits each channel of the mixing system to feed the reaction zone where it gets converted. Preferred embodiments include mixing $O_2$ with a hydrocarbon gas and converting the mixture in a catalytic reaction zone to produce synthesis gas.

59 Claims, 6 Drawing Sheets

U.S. PATENT DOCUMENTS

| | | | |
|---|---|---|---|
| 3,503,557 A | 3/1970 | Hutton, Jr. | |
| 3,518,284 A | 6/1970 | Foster | |
| 3,542,894 A | 11/1970 | Bartholome et al. | |
| 3,554,714 A * | 1/1971 | Johnson | 48/180.1 |
| 3,809,524 A | 5/1974 | Bruhlet et al. | |
| 3,825,400 A | 7/1974 | Popov | |
| 3,871,838 A | 3/1975 | Henkel et al. | |
| 3,881,701 A | 5/1975 | Schoenman et al. | |
| 3,881,857 A | 5/1975 | Hoy et al. | |
| 3,895,919 A | 7/1975 | Forster et al. | |
| 3,945,942 A | 3/1976 | Marion et al. | |
| 4,100,733 A | 7/1978 | Striebel et al. | |
| 4,136,015 A | 1/1979 | Kamm et al. | |
| 4,166,834 A | 9/1979 | Reed et al. | |
| 4,371,379 A | 2/1983 | Brent et al. | |
| 4,388,083 A | 6/1983 | Mauz | |
| 4,390,346 A | 6/1983 | Cramer et al. | |
| 4,477,262 A | 10/1984 | Pryor | |
| 4,484,885 A | 11/1984 | Machii et al. | |
| 4,498,786 A * | 2/1985 | Ruscheweyh | 366/336 |
| 4,521,117 A | 6/1985 | Ouwerkerk et al. | |
| 4,801,092 A | 1/1989 | Webber et al. | |
| 4,821,963 A | 4/1989 | Arnout et al. | |
| 4,865,820 A | 9/1989 | Dunster et al. | |
| 5,106,590 A | 4/1992 | Hopper et al. | |
| 5,163,830 A | 11/1992 | Pfefferkorn | |
| 5,229,102 A * | 7/1993 | Minet et al. | 423/652 |
| 5,292,246 A | 3/1994 | Gateau et al. | |
| 5,492,649 A | 2/1996 | Christensen | |
| 5,523,063 A | 6/1996 | Anderson | |
| 5,588,974 A * | 12/1996 | Tiller et al. | 48/127.9 |
| 5,611,684 A | 3/1997 | Spielman | |
| 5,723,094 A * | 3/1998 | Sunavala | 422/197 |
| 5,883,138 A | 3/1999 | Hershkowitz et al. | |
| 6,092,921 A | 7/2000 | Wentinck et al. | |
| 6,203,187 B1 | 3/2001 | Abbasi et al. | |
| 6,267,912 B1 | 7/2001 | Hershkowitz et al. | |
| 6,342,197 B1 * | 1/2002 | Senetar et al. | 423/652 |
| 6,471,937 B1 | 10/2002 | Anderson et al. | |
| 6,692,661 B1 | 2/2004 | Bedetti | |
| 6,824,675 B2 * | 11/2004 | Boyer et al. | 208/146 |
| 6,977,064 B1 * | 12/2005 | Adris et al. | 422/196 |
| 7,138,101 B2 * | 11/2006 | Keller et al. | 423/573.1 |
| 7,332,138 B2 * | 2/2008 | Gupta et al. | 422/194 |
| 2002/0021991 A1 * | 2/2002 | Boyer et al. | 422/195 |
| 2002/0031468 A1 * | 3/2002 | Gross et al. | 423/576.8 |
| 2002/0192154 A1 | 12/2002 | Kramer et al. | |
| 2003/0056439 A1 | 3/2003 | Wilhelm et al. | |
| 2004/0104147 A1 * | 6/2004 | Wen | 208/107 |
| 2005/0095186 A1 * | 5/2005 | McGee | 422/232 |
| 2005/0158235 A1 * | 7/2005 | Ramani et al. | 423/576.8 |

FOREIGN PATENT DOCUMENTS

| | | |
|---|---|---|
| EP | 0 303 439 | 2/1987 |
| EP | 0 842 894 | 5/1998 |
| WO | WO 97/37929 | 10/1997 |
| WO | WO 98/30322 | 7/1998 |
| WO | WO 01/18451 | 3/2001 |
| WO | WO 01/46068 | 6/2001 |

* cited by examiner

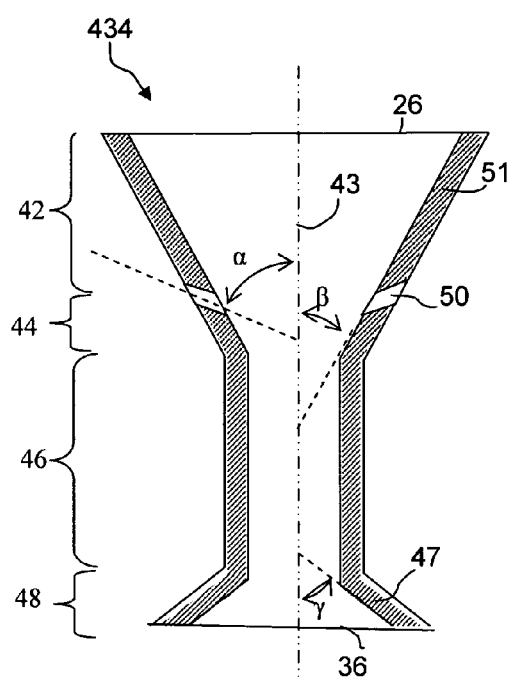
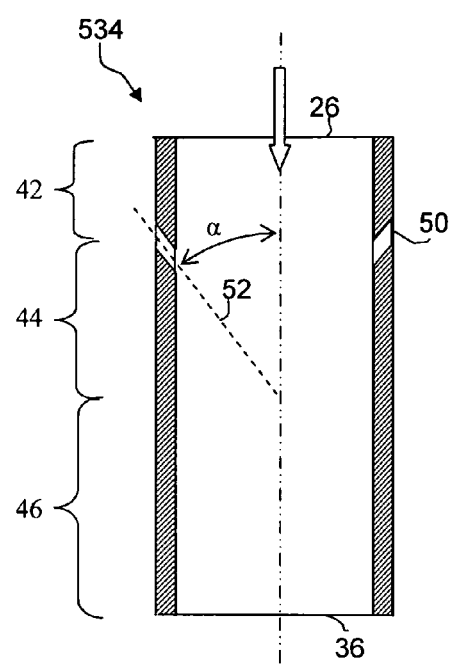
Fig. 7
Fig. 8

COMPACT MIXER FOR THE MIXING OF GASEOUS HYDROCARBON AND GASEOUS OXIDANTS

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD OF THE INVENTION

The present invention generally relates to a device and a method for safely mixing unreacted feed gases prior to feeding them into a reaction zone. More specifically, the present invention relates to a reactor system that includes a gas mixing system comprising at least one channel having at least one longitudinally-aligned inlet for injecting a first feedgas into the channel and at least one acutely-aligned inlet for injecting a second feedgas into the channel.

BACKGROUND OF THE INVENTION

Large quantities of methane, the main component of natural gas, are available in many areas of the world, and natural gas is predicted to outlast oil reserves by a significant margin. However, most natural gas is situated in areas that are geographically remote from population and industrial centers. The costs of compression, transportation, and storage make its use economically unattractive.

To improve the economics of natural gas use, much research has focused on natural gas or methane, the major chemical component of natural gas, as a starting material for the production of higher hydrocarbons and hydrocarbon liquids. The conversion of methane or natural gas to hydrocarbons is typically carried out in two steps. In the first step, methane or natural gas is reacted with water as steam, carbon dioxide and/or diatomic oxygen (i.e., $O_2$) to produce carbon monoxide and hydrogen (i.e., synthesis gas or syngas). This syngas generation usually occurs by steam reforming, dry reforming, autothermal reforming, partial oxidation, or combinations thereof. In a second step, the syngas is converted to higher hydrocarbon products by processes such as the Fischer-Tropsch synthesis. For example, hydrocarbon waxes, alcohols, fuels with boiling points in the middle distillate range, such as kerosene and diesel fuel, may be produced from the synthesis gas.

Current industrial use of methane as a chemical feedstock proceeds by the initial conversion of methane to carbon monoxide and hydrogen by either steam reforming, which is the most widespread process, or by dry reforming or by autothermal reforming. Steam reforming currently is the major process used commercially for the conversion of methane to synthesis gas, proceeding according to Equation 1.

$$CH_4 + H_2O \rightarrow CO + 3H_2 \qquad (1)$$

Although steam reforming has been practiced for over five decades, efforts to improve the energy efficiency and reduce the capital investment required for this technology continue. For many industrial applications, the 3:1 ratio of $H_2$:CO products is problematic, and the typically large steam reforming plants are not practical to set up at remote sites of natural gas formations.

Methane residence times in steam reforming are on the order of 0.5-1 second, whereas for heterogeneously catalyzed partial oxidation, the residence time is on the order of a few milliseconds. For the same production capacity, syngas facilities for the partial oxidation of methane can be far smaller, and less expensive, than facilities based on steam reforming. A recent report (M. Fichtner et al. *Ind. Eng. Chem. Res.* (2001) 40:3475-3483) states that for efficient syngas production, the use of elevated operation pressures of about 2.5 MPa is required. Those authors describe a partial oxidation process in which the exothermic complete oxidation of methane is coupled with the subsequent endothermic reforming reactions (water and $CO_2$ decomposition). This type of process can also be referred to as autothermal reforming or ATR, especially when steam is co-fed with the methane. Certain microstructured rhodium honeycomb catalysts are employed which have the advantage of a smaller pressure drop than beds or porous solids (foams) and which resist the reaction heat of the total oxidation reaction taking place at the catalyst inlet. The honeycomb is made by welding together a stack of rhodium foils that have been microstructured by means of wire erosion or cutting.

The catalytic partial oxidation ("CPOX") or direct partial oxidation of hydrocarbons (e.g., natural gas or methane) to syngas has also been described in the literature. In catalytic partial oxidation, natural gas is mixed with air, oxygen-enriched air, or oxygen, and introduced to a catalyst at elevated temperature and pressure. The net partial oxidation of methane yields a syngas mixture with a $H_2$:CO ratio of 2:1, as shown in Equation 2.

$$CH_4 + \tfrac{1}{2}O_2 \rightarrow CO + 2H_2 \qquad (2)$$

This ratio is more useful than the $H_2$:CO ratio from steam reforming for the downstream conversion of the syngas to chemicals such as methanol or to fuels. Furthermore, oxidation reactions are typically much faster than reforming reactions. This allows the use of much smaller reactors for catalytic partial oxidation processes than is possible in a conventional steam reforming process.

While its use is currently limited as an industrial process, the exothermic direct partial oxidation or CPOX of methane has recently attracted much attention due to its inherent advantages, such as the fact that due to the significant heat that is released during the process, there is no requirement for the continuous input of heat in order to maintain the reaction, in contrast to steam reforming processes.

The current interest in partial oxidation processes has resulted in various improvements in the technologies associated with that process, including catalyst composition, catalyst structure, reactor structure, and operating parameters. One aspect that has not received as much attention is the technology associated with the injection of feed gases into the partial oxidation reactor. In particular, it is necessary to feed methane and an oxygen-containing gas into the reactor under conditions of elevated temperature and pressure. The same feed conditions that are conducive to efficient operation of the partial oxidation process, however, are conducive to reactions that are less desirable, and possibly even hazardous, such as the ignition and combustion of the feedstock. While it is desirable to mix the feed gases as completely as possible, so as to maximize the efficiency of the catalytic reaction, it is particularly desirable to avoid premature reaction of the gases.

Catalytic partial oxidation processes attempt to eliminate gas phase oxidation reactions entirely, so that all of the partial oxidation reactions take place on the catalyst surface. The reactants are contacted with the catalyst at a very high space velocity, so that gas phase reactions are minimized. Gas phase reactions are undesirable because they can increase the occurrence of undesired combustion reactions (producing steam and carbon dioxide), damage the catalyst, and accelerate its deactivation.

Hence, there is a need for a method and apparatus for mixing partial oxidation feed gases that achieves thorough mixing, and if necessary preheat, and provides an even distribution of the mixed gases across the catalyst surface, while minimizing or preventing undesired gas phase reactions.

SUMMARY OF THE INVENTION

The present invention provides a method and apparatus for mixing partial oxidation feed gases. The present invention can be used for mixing partial oxidation feed gases or other gases, such as reactants for use in a catalyzed reaction. The present invention provides an apparatus that achieves thorough mixing of the feed gases prior to entering a reaction zone, while minimizing or preventing undesired premature reactions (i.e., before entry into the reaction zone).

In particular, the present invention comprises a reactor having a mixing apparatus in which a first feed gas is passed through a plurality of channels by entering a first injection portion of each channel, and in which a second feed gas is separately injected into a second injection portion of each channel through one or more inlets that are inclined at an acute angle with respect to the longitudinal axis of each channel. In each channel, the second injection portion is preferably downstream of the first injection portion of said channel, so that one or more second feed gas flowstreams are injected in a non-orthogonal direction into the flowstream of the first feed gas passing through said channel. The first and second injection portions of each channel may each have a uniform cross-section or uniform characteristic width along their respective lengths. Additionally or alternatively, the first and second injection portions of each channel may comprise a non-constant section which has a varying characteristic width. In preferred embodiments, the first injection portion of each channel comprises a constant section and the second injection portion of each channel comprises a decreasing-width section. The first and second feed gases then mix as they flow through the rest of the channel, which may include at least one mixing portion located downstream of said injection portions. The mixing portion may have a constant or non-constant cross-sectional area. The mixing portion may include an expanded-width section in which the linear velocity of the mixed feedgas is reduced prior to contacting the reaction zone. In preferred embodiments, the reaction zone includes a catalyst bed.

One embodiment of the invention relates to a reactor system for partially oxidizing a feed gas comprising a vessel having an upstream end and a downstream end; a reaction zone disposed within the downstream end of vessel and a channel disposed within the upstream end of vessel. The channel preferably has at least one channel outlet in fluid communication with the catalyst-containing zone, and includes: a first injection portion having a longitudinal axis and including a first gas inlet in fluid communication with a first gas feed, the first inlet being parallel to said longitudinal axis; a second injection portion in fluid communication with said first injection portion and including at least a second gas inlet in fluid communication with a second gas feed, the second gas inlet having a flow axis defining an angle of between 0 and 90 degrees, exclusive, with respect to the longitudinal axis of said first injection portion; and a mixing portion in fluid communication with the second injection portion and the channel outlet. In preferred embodiments, the reaction zone comprises a catalyst bed. In some embodiments, the channel further includes an expanded-width section in fluid communication with the mixing portion of the channel and located downstream of the mixing portion. In these embodiments, the expanded-width section comprises the channel outlet.

The various portions of each flow channel may each have a uniform or non-uniform internal cross-section along their lengths.

In certain embodiments the devices of the present invention can be used as gas mixers and may comprise a plurality of flow channels. Other embodiments of the present invention relate to methods for partially oxidizing a hydrocarbon feed gas using the devices described herein. The preferred methods include injecting a first feedgas comprising at least one hydrocarbon into the first injection portion(s) via the first gas inlet(s); separately injecting a second feedgas comprising diatomic oxygen into the second injection portion(s) via the second gas inlet(s); and reacting the resulting feedgas mixture in a catalyst-containing zone so as to produce a product stream. In preferred embodiments, the product stream comprises hydrogen and carbon monoxide. In some embodiments, the product stream comprises a hydrogen-to-carbon monoxide molar ratio between about 1.4:1 and about 2:1. Additionally or alternatively, the product stream comprises less than 5 percent by volume of carbon dioxide. The second feedgas comprises diatomic oxygen and optionally steam with a steam-to-$O_2$ molar ratio of less than 0.5:1. In preferred embodiments, the second feedgas comprises more than 50 vol.% of $O_2$, and the first feedgas comprises more than 70 vol.% of methane.

These and other embodiments, features and advantages of the present invention will become apparent with reference to the following description and drawings.

BRIEF DESCRIPTION OF THE DRAWINGS

For a more detailed understanding of the preferred embodiments, reference is made to the accompanying drawings, wherein:

FIG. 7 represents an enlarged cross-section of a single channel designed in accordance with a fifth embodiment of the invention;

FIG. 8 represents an enlarged cross-section of a single channel designed in accordance with a sixth embodiment of the invention.

DETAILED DESCRIPTION OF THE PREFERRED EMBODIMENTS

Figure 1:
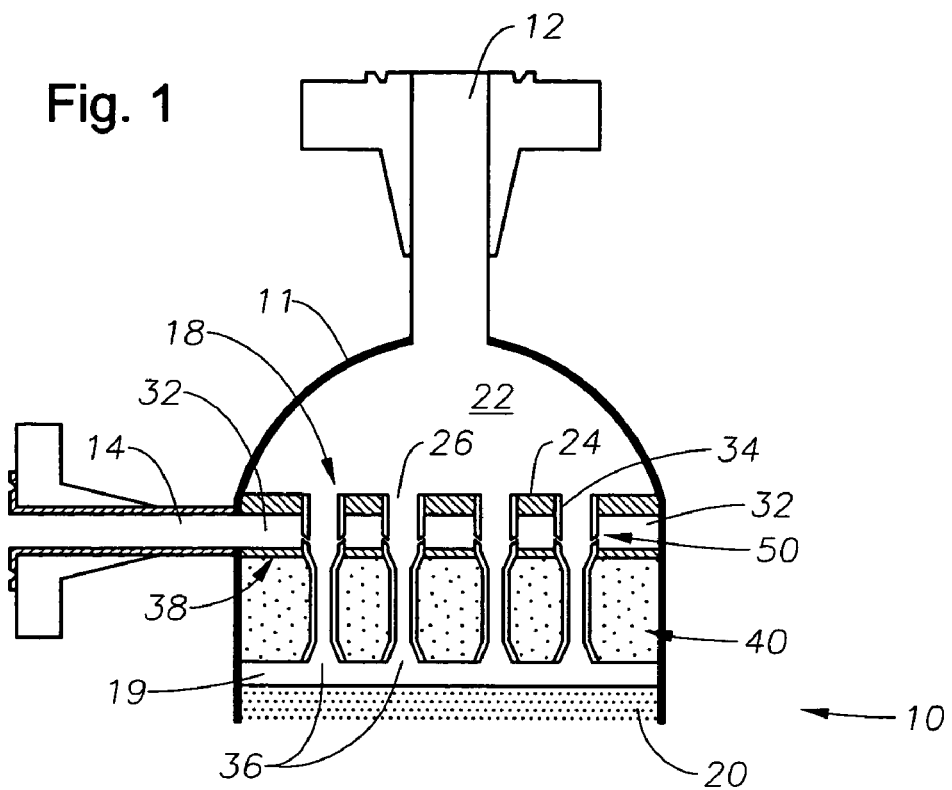
FIG. 1 represents a schematic cross-section of a reactor including a multi-channel gas mixer in accordance with a first embodiment of the present invention.

Referring initially to FIG. 1, a reactor 10 that is suitable for producing synthesis gas by partial oxidation of a light hydrocarbon, or for carrying out other oxidation reactions, comprises a housing 11, feed injection openings 12 and 14, a gas mixing system 18, a post-mixing chamber 19, and a reaction zone 20. If desired, reactor 10 may include an optional heating or cooling zone (not shown) downstream of reaction zone 20. Housing 11 is preferably made of materials capable of withstanding at least the temperatures generated by the exothermic net partial oxidation reaction (POX) set out in Reaction 2 (in the case of methane as the feed hydrocarbon). In commercial scale operations the reactor housing may be constructed of, or lined with, any suitable refractory material that is capable of withstanding the temperatures generated by the exothermic POX reaction, or at least 1,600° C., preferably up to about 2,000° C.

Each injection opening 12, 14 is in fluid communication with chambers 22 and 32 respectively, and fluids entering reactor 10 through injection openings 12, 14 are maintained separate from each other until they enter mixing system 18. More particularly, injection opening 12 feeds a first feedgas into a chamber 22, which serves as a first manifold. The floor 24 of chamber 22 has a plurality of openings 26 therein. Likewise, injection opening 14 feeds a second feedgas via another chamber 32, which serves as a second manifold. The floor 24 of chamber 22 also forms the upper end of chamber 32. Mixing system 18 comprises one or more tubes, conduits, or channels 34, each of which comprises one opening 26, at least one inlet 50 and one outlet 36. In a preferred embodiment, a plurality of tubes, conduits, or channels 34 extend through a portion of chamber 32 and provide fluid communication between chamber 22 and post-mixing chamber 19. In other embodiments, a single channel 34 may be used. Each channel 34 defines a fluid passage between opening 26, which is the channel inlet, and outlet 36, which opens into post-mixing chamber 19. Chamber 32 may be disposed between the floor 24 of chamber 22 and the floor 38 of chamber 32. The floor 38 of chamber 32 also has a plurality of openings, through which the one or more channels 34 pass. In some embodiments, each channel 34 may comprise a lumen of a tube-like structure. Each channel 34 preferably includes one or more inlets 50, which allow fluid communication between chamber 32 and channel(s) 34. In preferred embodiments, opening 26 allows passage of the first feedgas from chamber 22 to channel 34, while the one or more inlets 50 allow passage of the second feedgas from chamber 32 to channel 34. The flow of the second feedgas in chamber 32 is divided into multiple second feedgas split-streams through inlet(s) 50 of each channel 34. In preferred embodiments, the multiple second feedgas split-streams flowing through inlets 50 have equal gas linear velocity or have substantially the same gas linear velocity.

As shown in FIG. 1, reactor 10 preferably includes a plurality of channels 34. In various embodiments, there may be 10, 14, 20, 30 or more channels 34. Channels 34 are preferably supported at desired locations within reactor vessel 10 by a non porous material, which may also serve as the floor 24 of chamber 22. A second non-porous material preferably forms the floor 38 of chamber 32 and may also provide support to channels 34.

In preferred embodiments, each channel 34 is anchored in place by the floor 24 of chamber 22 as well as by the floor 38 of chamber 32. Because of this arrangement, the floor 24 of chamber 22 may be called 'top channel sheet' or 'top tube sheet', and the floor 38 of chamber 32 may be called 'bottom channel sheet' or 'bottom tube sheet'.

Below the floor 38 of chamber 32, the channels 34 may be surrounded by a gas phase, but are preferably at least partially surrounded by a solid filler 40. The solid filler 40 helps prevent gas flow into the space between channels 34. The solid filler 40 may partially or completely fill the space between channels 34 from floor 38 down to the edge of channel outlets 36. The solid filler 40 may comprise any suitable refractory material that is capable of withstanding the temperature generated by the chemical reaction in reaction zone 20 located downstream of said solid filler. A "refractory material" refers to any material that is mechanically stable to the high temperatures of a catalytic partial oxidation reaction, which is typically 500° C.-1,600° C., but may be as high as 2,000° C. Examples of suitable refractory materials include but are not limited to: titania, silica, zirconia, magnesium stabilized zirconia, zirconia stabilized alumina, yttrium stabilized zirconia, calcium stabilized zirconia, alumina, magnesia, niobia, vanadia or other inorganic oxides such as calcium oxide and iron oxide, cordierite, zinc oxide, phosphates (such as aluminum phosphates or silica alumina phosphates), or mixtures thereof. The solid filler 40 is preferably castable. Solid filler 40 preferably comprises a refractory material containing alumina or mixtures of silica and alumina. In some embodiments, the solid filler 40 is made of a castable strong, dense ceramic material.

Figure 2:
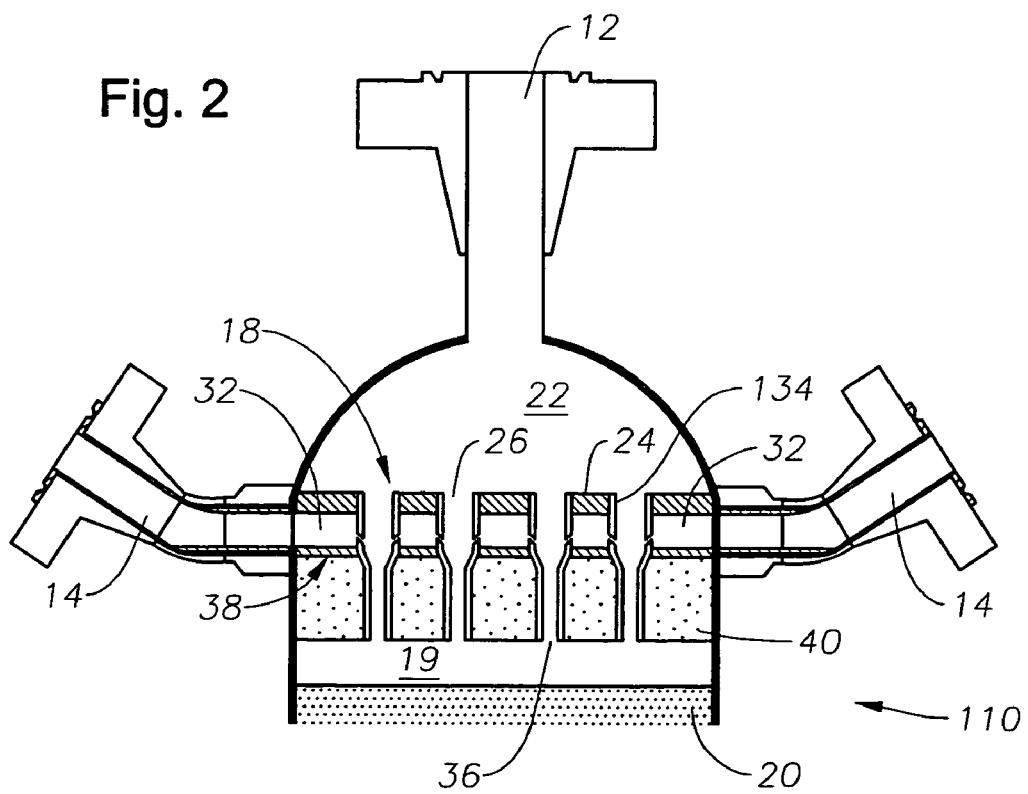
FIG. 2 represents a schematic cross-section of a reactor including a multi-channel gas mixer in accordance with a second embodiment of the present invention.

Referring now to FIG. 2, reactor 110 is set-up in a similar fashion as reactor 10 of FIG. 1, except that reactor 110 has two injection openings 14 to distribute the second feedgas into chamber 32, and channels 134 have a different design compared to that of channels 34 illustrated in FIG. 1, as described in detail below.

The mixing efficiency of the present gas mixing systems may be assessed by measuring the content in the mixed feedgas exiting channels 34 of at least one component from the first or second feedgas. Alternatively, the mixing efficiency of the gas mixing system may be determined by measuring the molar ratio of one component of the second feedgas to another component present in the first feedgas. For example, when the first feedgas comprises a hydrocarbonaceous gas and the second feedgas comprises oxygen gas (i.e., $O_2$), the molar ratio of carbon-to-$O_2$ ($C:O_2$) of the gas present in post-mixing chamber (19) should vary by not more than 0.1; preferably by not more than 0.08, more preferably by not more than 0.05; still more preferably by not more than 0.025. The mixing efficiency can be estimated by measuring the content of one or more components of the mixed feedgas at different locations within the post-mixing chamber 19 and/or at the exit of channels 34, 134.

In some embodiments, one or more of channels may, if desired, be provided with an internal surface comprising a material resistant to a high temperature (i.e., higher than 500° C.) such as an alloy of nickel, chromium, iron and combinations thereof.

In alternate embodiments, one or more of the gas channels may, if desired, be provided with an internal surface comprising a catalytically-inert material. The internal surface of at least one channel may be coated with or manufactured from said catalytically-inert material, which is preferably overlain, clad, metallurgically bonded or plated. This inner surface material should primarily be effective in minimizing or preventing the possible catalytic effect of the mixer material with either feedgas or mixture thereof to which the mixer material is exposed. For example, when the mixing system 18 is to be used for mixing an oxygen gas-containing feed and a hydrocarbonaceous gas feed upstream of reaction zone 20 comprising the partial oxidation reaction of said hydrocarbonaceous gas feed with oxygen gas, this catalytically-inert material may be selected from materials that would not catalyze undesirable premature reactions, such as combustion (complete oxidation of hydrocarbonaceous gas) and/or coke formation (polymerization of hydrocarbonaceous gas). Suitable materials may comprise one or more ceramic materials, or one or more refractory materials such as comprising silica, alumina, zirconia, a metal from Group 11 of the Periodic Table (new IUPAC notation), an alloy comprising a Group 11 metal, or any combination thereof. Preferably, the suitable catalytically-inert material comprises a material selected form the group consisting of alumina, silica, gold, copper, bronze, and any combination of two or more thereof. When the catalytically-inert material comprises bronze, it preferably comprises tin bronze, manganese bronze, or combinations thereof, and does not contain aluminum bronze.

Figure 3:
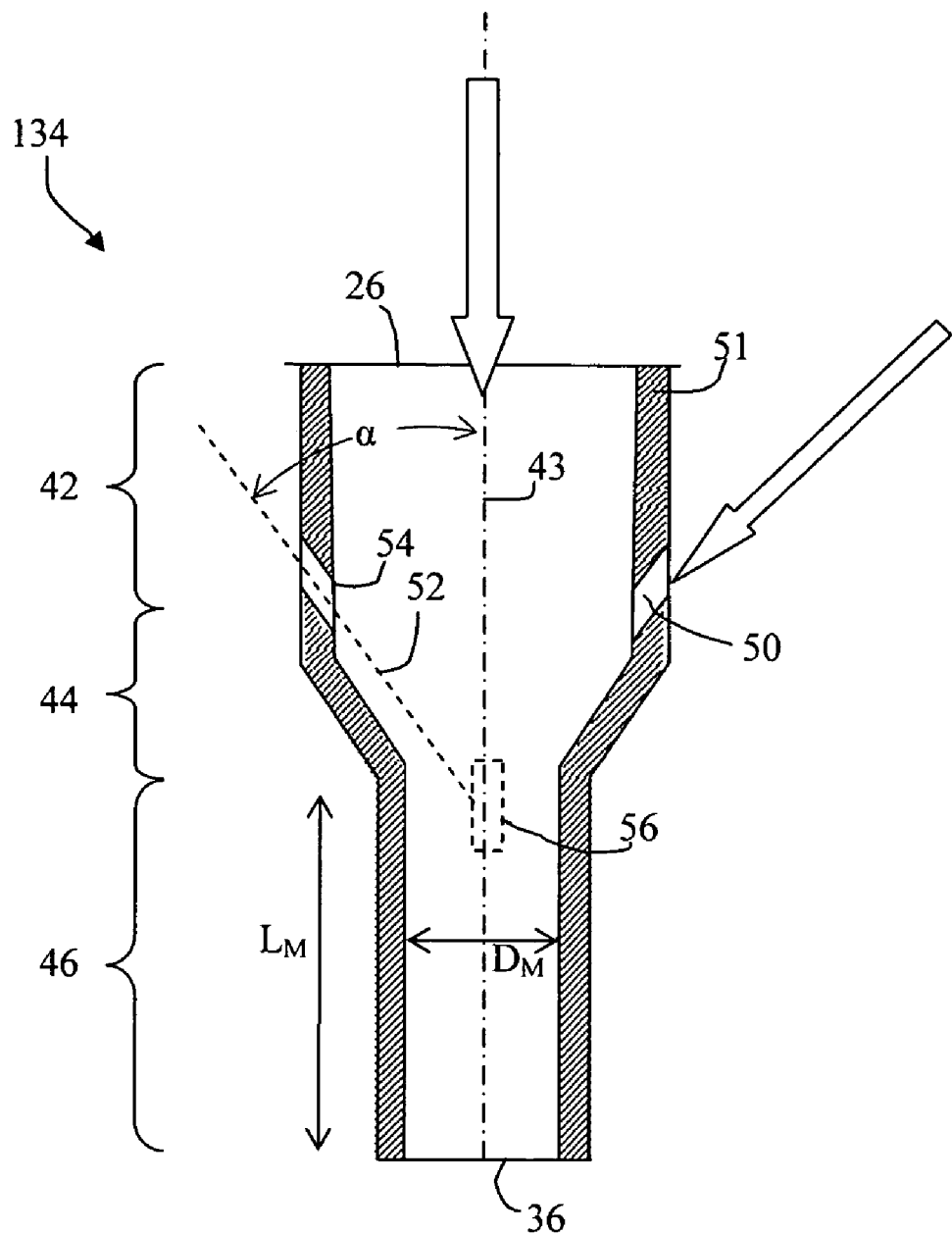
FIG. 3 represents an enlarged cross-section of a single channel designed in accordance with the second embodiment of the invention.

Referring now to FIG. 3, a channel 134 is constructed to introduce a second feedgas from chamber 32 into a stream of first feedgas from chamber 22 in such a way that the exiting gas stream leaving each channel 34 at channel outlet 36 is completely mixed. The stream of first feedgas from chamber 22 enters channel 34 at first feedgas inlet 26. Channels 134 preferably include a first injection portion 42, a second injection portion 44, and a mixing portion 46. First injection portion 42 preferably has a uniform cross-sectional area along its length. First injection portion 42 preferably comprises a cylindrical passage having a longitudinal axis 43. For simplicity, a portion having a uniform cross-section along its length may sometimes be referred to as having a "constant cross-section."

Second injection portion 44 is preferably frustoconical, having a smaller internal cross-sectional area at its downstream end, which is in fluid communication with mixing portion 46, than at its upstream end, which is in fluid communication with first injection portion 42. The general direction of gas flow in channel 134 is from first feedgas inlet 26 to channel outlet 36.

Channel 134 preferably includes at least one, more preferably at least 2, still more preferably at least 4, and yet still more preferably at least 6 second feedgas inlets 50 extending through the channel wall 51. Inlets 50 allow fluid communication between chamber 32 and the inside of each channel 134, and thereby allow the passage of the second feedgas into the channels. Each inlet 50 preferably defines a flow axis 52 that is inclined with respect to the longitudinal axis 43 of the first injection portion 42 of channel 134 such that the second feedgas passing through an second feedgas inlet 50 has a flow axis defining an acute angle α with respect to the longitudinal axis 43 of the first injection portion 42. The angle α defined between flow axis 52 and the longitudinal channel axis 43 is preferably between 0 and 90 degrees, exclusive, i.e., the axis 52 and the axis 43 are neither parallel nor perpendicular. The acute angle α may be between about 5 and about 85 degrees, is preferably between about 10 and about 80 degrees, more preferably between about 30 and about 60 degrees, and still more preferably between about 35 and about 55 degrees. In certain embodiments, the acute angle α between flow axis 52 and longitudinal axis 43 is between about 40 and about 50 degrees.

Without wishing to be bound by any theory, it is believed that, when the second feedgas is passed through an inlet 50 which has a flow axis perpendicular (i.e., right-angle α) to the longitudinal axis 43 of the first injection portion 42, this perpendicular injection into the flow of the first feedgas causes some of the second feedgas to move upstream of the inlet 50 (i.e., in first injection portion 42) due to turbulent backmixing. This turbulent backmixing can thereby create pockets enriched in the second feedgas inside the first feedgas flowstream upstream of the inlet 50. Moreover, this turbulent backmixing can lengthen the residence time of the second feedgas inside channel 134, which may in turn increase the chance of undesirable premature reaction between the two feedgases inside channel 134. It is thus believed that the injection of the second feedgas at an acute angle α (excluding 0 and 90 degrees) into the flow of the first feedgas is more desirable as it minimizes the incidence of backmixing of the second feedgas, and thereby allows better control of the residence time of the second feedgas. Similarly, an angle α greater than 90 degrees (e.g., obtuse angle) would be even less desirable than a right-angle α, as the injection of the second feedgas at an obtuse angle α (excluding 90 and 180 degrees) into the flow of the first feedgas would direct the second feedgas towards the channel inlet (i.e., opening 26), thereby creating pockets enriched in the second feedgas inside the first feedgas flowstream upstream of the inlet 50 (i.e., in first injection portion 42).

Downstream of second injection portion 44 is mixing portion 46. Mixing portion 46 preferably has a length $L_M$ and a constant cross-section having a characteristic internal width $D_M$. In some embodiments, mixing portion 46 may have a length-to-width ratio ($L_M:D_M$) greater than about 3:1. In still further embodiments, mixing portion 46 may have a length-to-width ratio ($L_M:D_M$) greater than about 6:1. In other embodiments, mixing portion 46 may have a length-to-width ratio ($L_M:D_M$) greater than about 10:1. In embodiments wherein first injection portion 42 also has a constant cross-section, the uniform internal cross-sectional areas of mixing portion 46 and first injection portion 42 may be the same; alternatively, mixing portion 46 may have a uniform internal cross-sectional area that is smaller than that of first injection portion 42. In certain preferred embodiments, the ratio of the internal cross-sectional area of mixing portion 46 to that of first injection portion 42 is between about 0.25 and about 1. In other embodiments, the ratio of the internal cross-sectional area of mixing portion 46 to that of first injection portion 42 is between about 0.4 and about 0.65, or between about 0.5 and about 0.6.

It is preferred, although not necessary, that inlets 50 are located at the same longitudinal position along channel wall 51. It is preferred, although not necessary, that inlets 50 are disposed uniformly along a circumference of channel wall 51, such as spaced. Alternatively, although less preferred, inlets 50 may be disposed non-uniformly across a circumference of channel wall 51. In other embodiments, inlets 50 are disposed across more than one circumference of channel wall 51. The most upstream internal edge 54 of inlets 50 typically defines the boundary between first injection portion 42 and second injection portion 44. In some embodiments, the longitudinal positions of internal edges 54 of inlets 50 located on channel wall 51 vary by less than about 12 millimeters, preferably by less than about 6 mm, more preferably by less than about 3 mm. The plurality of inlets 50 may be disposed across channel wall 51 in such a manner that their respective flow axes 52 intersect along, or in the vicinity of, the longitudinal axis 43. During the making of inlets 50 through wall 51, some slight variation in the inclination angle α of each of inlets 50 (within a +/−5 degree variance in angle, preferably within a +/−3 degree variance in angle, more preferably within a +/−1 degree variance in angle) is expected. In some embodiments, the inlets 50 are disposed across channel wall 51 with their respective acute angles of their flow axis 52 differing by not more than 10 degrees, preferably not more than 5 degrees, more preferably not more than 3 degrees, still more preferably not more than 2 degrees.

In preferred embodiments, inlets 50 are disposed with the same acute angle α or with a similar acute angle α (within a +/−5 degree variance in angle, preferably within a +/−3 degree variance in angle, more preferably within a +/−1 degree variance in angle) across channel wall 51. Similarly, inlets 50 may be configured such that their flow axes do not intersect on the channel axis, either because they are axially spaced apart, or because one or more flow axes do not lie in a radial plane, or both. Therefore, it is envisioned that the respective flow axes 52 may not intersect exactly on the longitudinal axis 43, but meet in an inner region 56 that lies on longitudinal axis 43. In some embodiments, the width of inner region 56, where respective flow axes 52 from inlets 50 meet, includes not more than 30% of the entire internal width $D_M$ of mixing portion 46. In alternate embodiments, the width of inner region 56 includes not more than 20% of the entire internal width $D_M$. In yet other embodiments, the width of inner region 56 includes not more than 10% of the entire internal width $D_M$. Inner region 56 may be disposed within second injection portion 44, within mixing portion 46, or partially within second injection portion 44 and partially within mixing portion 46. Mixing portion 46 communicates with channel outlet 36 and allows the feedgas mixture to flow into post-mixing chamber 19, so that mixed feedgases exit channel 134 with a total gas velocity that is about the same as the gas velocity in mixing portion 46. In some embodiments, the internal cross-sectional area of channel outlet 36 may be smaller than that of first feedgas inlet 26.

The total gas velocity of the mixed feedgas exiting channel 134 via the channel outlet 36 is preferably greater than 1 meter per second (m/s). In some embodiments, the total gas velocity of the mixed feedgas exiting channel 134 is greater than about 3 m/s; preferably greater than about 10 m/s; more preferably greater than about 20 m/s; and still more preferably greater than about 30 m/s. It is preferred that the total gas velocity of the mixed feedgas exiting channel 134 be less than about 100 m/s and more preferably less than about 80 m/s.

In some embodiments, mixing portion 46 may be sized such that the total gas velocity therein is greater than 3 m/sec, more preferably greater than 10 m/sec, and still more preferably greater than 18 m/sec.

There exists a pressure drop across channel 134 between first feedgas inlet 26 and channel outlet 36. This pressure drop preferably does not exceed 5% of the pressure at the first feedgas inlet 26.

In embodiments in which the first feedgas comprises a hydrocarbonaceous gas and the second feedgas comprises an oxygen-containing gas (i.e., $O_2$), the flowlines of the second feedgas split-streams passing through inlets 50 are directed along flow axes 52 in a non-orthogonal direction with respect to the flowline of the first feedgas, preferably with an acute angle, so as to mix the second feedgas comprising $O_2$ with amounts of first feedgas comprising the hydrocarbonaceous gas at local constant molar ratio of C:$O_2$. Furthermore, the flowlines of the second feedgas split-streams passing through inlets 50 and the flowline of the first feedgas passing through inlet 26 are not parallel. When the second feedgas comprises diatomic oxygen (preferably more than 50% $O_2$; more preferably more than 80% $O_2$), the temperature of the gas mixture within mixing zone 46 should be below the autoignition temperature of the gas mixture. In some embodiments, the temperature of the feedgases mixture within mixing zone 46 is at least 93° C. below the autoignition temperature of the gas mixture.

In some embodiments, first injection portion 42 of channel 134 has a constant cross-sectional area between about 20 cm² and about 325 cm²; preferably between about 20 cm² and about 125 cm²; more preferably between about 45 cm² and about 125 cm². Likewise, mixing portion 46 of channel 134 preferably has a cross-sectional area between about 5 cm² and about 90 cm²; between about 8 cm² and about 50 cm².

In preferred embodiments of FIG. 3, the injection of the second feedgas via inlets 50 into channel 134 is immediately followed by a reduction of the cross-sectional flow area of the channel 134, so that the combined flow of first feedgas and second feedgas is accelerated while passing through mixing portion 46.

Figure 4:
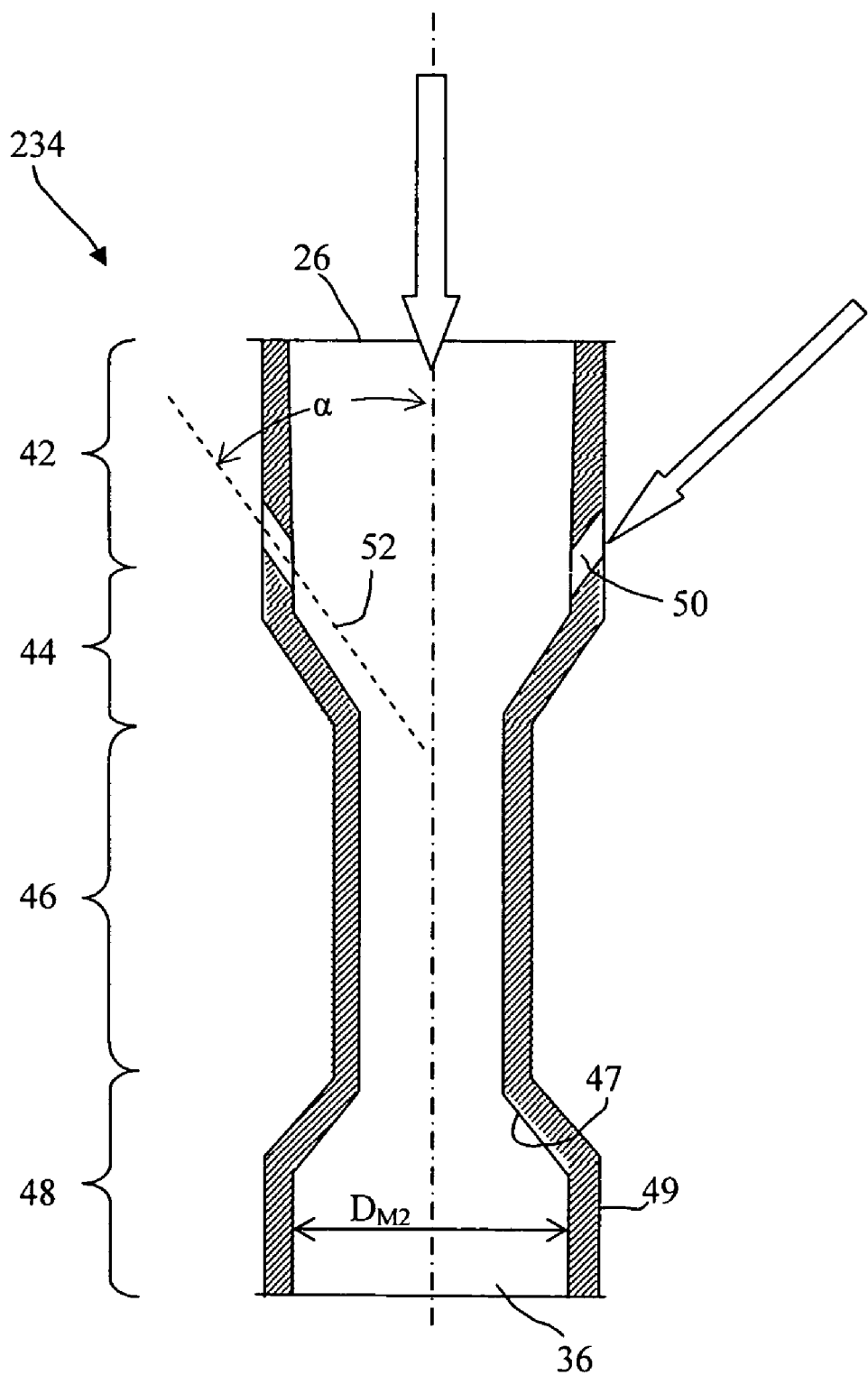
FIG. 4 represents an enlarged cross-section of a single channel designed in accordance with the first embodiment of the invention.

Another channel design is illustrated in FIG. 4. As shown, channel 234 of FIG. 4 differs from channel 134 in FIG. 3, as channel 234 further includes an additional mixing portion 48. Additional mixing portion 48 is preferably provided downstream of first mixing portion 46. Generally, additional mixing portion 48 comprises the lumen of a structure which may have a varying internal width. For example, additional mixing portion 48 may include an expanding section (e.g., shown as 47) and/or a constant cross-section section (e.g., shown as 49). In some embodiments, additional mixing portion 48 comprises an expanded section 49. In preferred embodiments, expanded section 49 is located in the downstream end of additional mixing portion 48. Expanded section 49 preferably has a constant cross-section (i.e., uniform cross-sectional area) and is characterized by an internal width ($D_{M2}$) that is larger than that of mixing portion 46. In preferred embodiments, expanded-width section 49 is cylindrical in shape. Regardless of whether either portion 42 or 49 has a constant cross-section (or uniform cross-sectional area), the average internal width (or the cross-sectional area) of expanded section 49 may be greater than or equal to that of first injection portion 42.

Additional mixing portion 48 may be provided with an expanding section 47 between mixing portion 46 and expanded section 49. The internal characteristic width of expanding section 47 is preferably smaller at its upstream end, which is in fluid communication with mixing portion 46, than at its downstream end, which is in fluid communication with expanded section 49. In some embodiments, additional mixing portion 48 comprises an expanding section 47 in which the internal cross-sectional area of expanding section 47 increases gradually in the direction of the feedgases flow from the internal cross-sectional area of constant mixing portion 46 until it reaches the internal cross-sectional area of constant expanded section 49. In preferred embodiments, the downstream end of expanding section 47 has the same internal characteristic width than that of constant expanded section 49; and the upstream end of expanding section 47 has the same internal characteristic width than that of constant mixing section 46. Expanding section 47 may be frustoconical, trapezoidal, or truncated-pyramidal.

When present, the expanded section 49 of additional mixing portion 48 communicates with channel outlet 36 and allows the feedgas mixture to flow into post-mixing chamber 19, 119 in FIGS. 1 and 2, respectively, with a total gas velocity lower than the gas velocity in mixing portion 46. The cross-sectional areas of first feedgas inlets 26 may be greater than, equal to or less than those of channel outlets 36.

Figure 5:
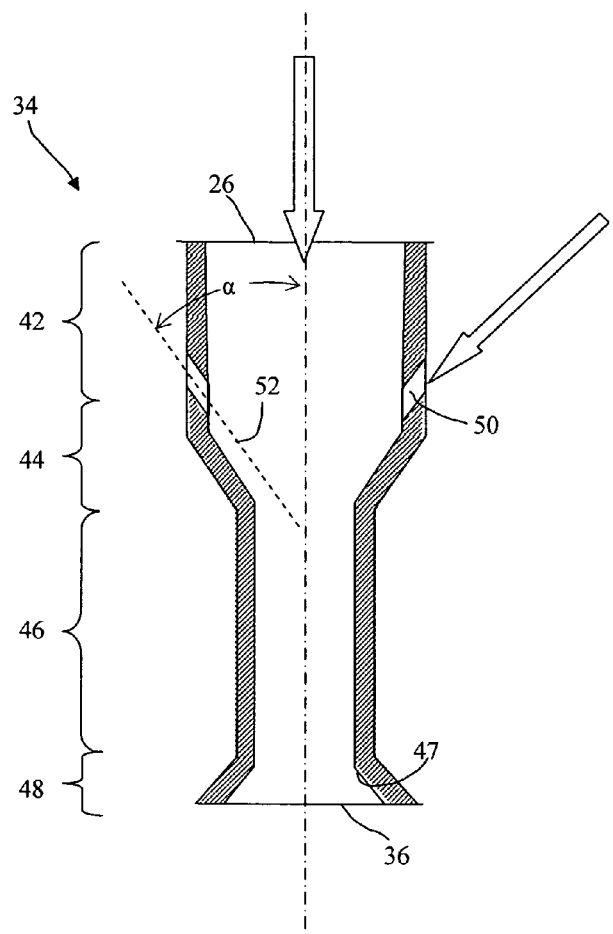
FIG. 5 represents an enlarged cross-section of a single channel designed in accordance with a third embodiment of the invention.

Another channel design 34 is illustrated in FIG. 5. Channel 34 includes an additional mixing portion 48 that comprises an expanding-section 47 but lacks a constant cross-section section such as expanded section 49 of channel 134. As above, expanding section 47 communicates with channel outlet 36 and allows the feedgas mixture to flow into the post-mixing chamber. In this embodiment, the cross-sectional areas of first feedgas inlet 26 and channel outlet 36 are preferably the same.

Figure 6:
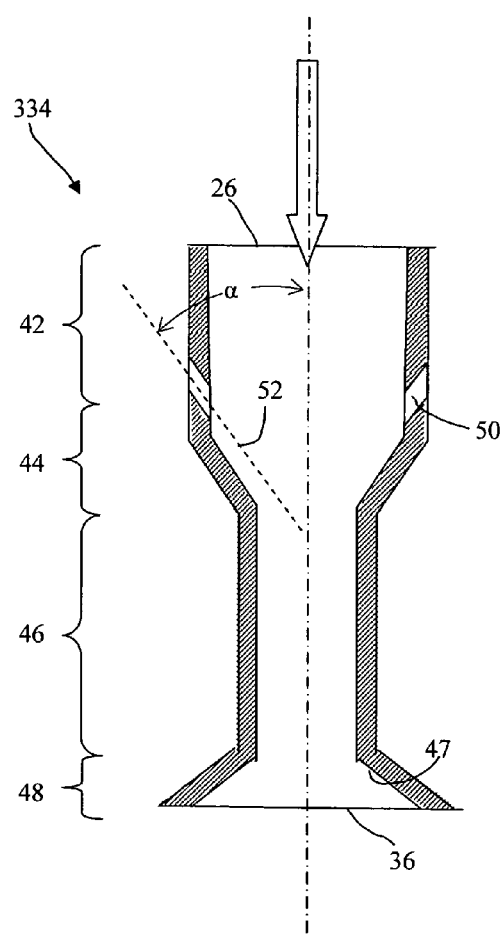
FIG. 6 represents an enlarged cross-section of a single channel designed in accordance with a fourth embodiment of the invention.

Another channel design 334 is illustrated in FIG. 6. As with channel 34 of FIG. 5, channel 334 includes an additional mixing portion 48 that includes an expanding-width section 47 and no expanded-width section downstream of said section 47. Channel 334 differs from channel 34 in that the cross-sectional areas of first feedgas inlet 26 and channel outlet 36 are different. As illustrated, channel outlet 36 has a larger cross-sectional area than first feedgas inlet 26. Although not illustrated, the cross-sectional area of channel outlet 36 could alternatively be smaller than that of the first feedgas inlet 26 but yet still larger than that of mixing portion 46.

Another channel design 434 is illustrated in FIG. 7. Channel 434 comprises first injection portion 42, second injection portion 44, mixing portion 46, and additional mixing portion 48 comprising expanding-section 47. Instead of being of uniform cross-section as described in FIGS. 3-6, however, in this embodiment first injection portion 42 is frusto-conical, with a decreasing cross-sectional area in the direction of the first feedgas propagation. The channel wall 51 of injection portion 42 is disposed at an angle $\beta$ with respect to longitudinal axis 43 of the first injection portion 42. The angle $\beta$ is preferably smaller than angle $\alpha$ which is described earlier in FIGS. 3-6. In some embodiments, inlets 50 are disposed along a circumference of wall 51 within the frusto-conical section of first injection portion 42. In alternate embodiments (not shown), inlets 50 are disposed along a circumference of wall 51 within a cylindrical section below said frusto-conical section of first injection portion 42. The frusto-conical section may extend into the second injection portion 44 as shown.

Still referring to FIG. 7, this embodiment differs from other embodiments in that the cross-sectional area of first feedgas inlet 26 is greater than that of channel outlet 36. Expanding section 47 of portion 48 has a frusto-conical shape with an increasing cross-sectional area in the direction of the mixed feedgas propagation. The channel wall 51 of expanding section 47 is disposed at an angle $\gamma$ with respect to axis 43, wherein the angle $\gamma$ may be greater or smaller than the angle $\beta$, or about the same as angle $\beta$.

Still another channel design 534 is illustrated in FIG. 8. As shown therein channel 534 includes a first injection portion 42, second injection portion 44, and mixing section 46. Unlike in previously described embodiments, however, portions 42, 44, and 46 all have the same cross-sectional area, with the result that gases passing through channel 534 are not substantially decelerated or accelerated by the channel configuration.

Figure 9:
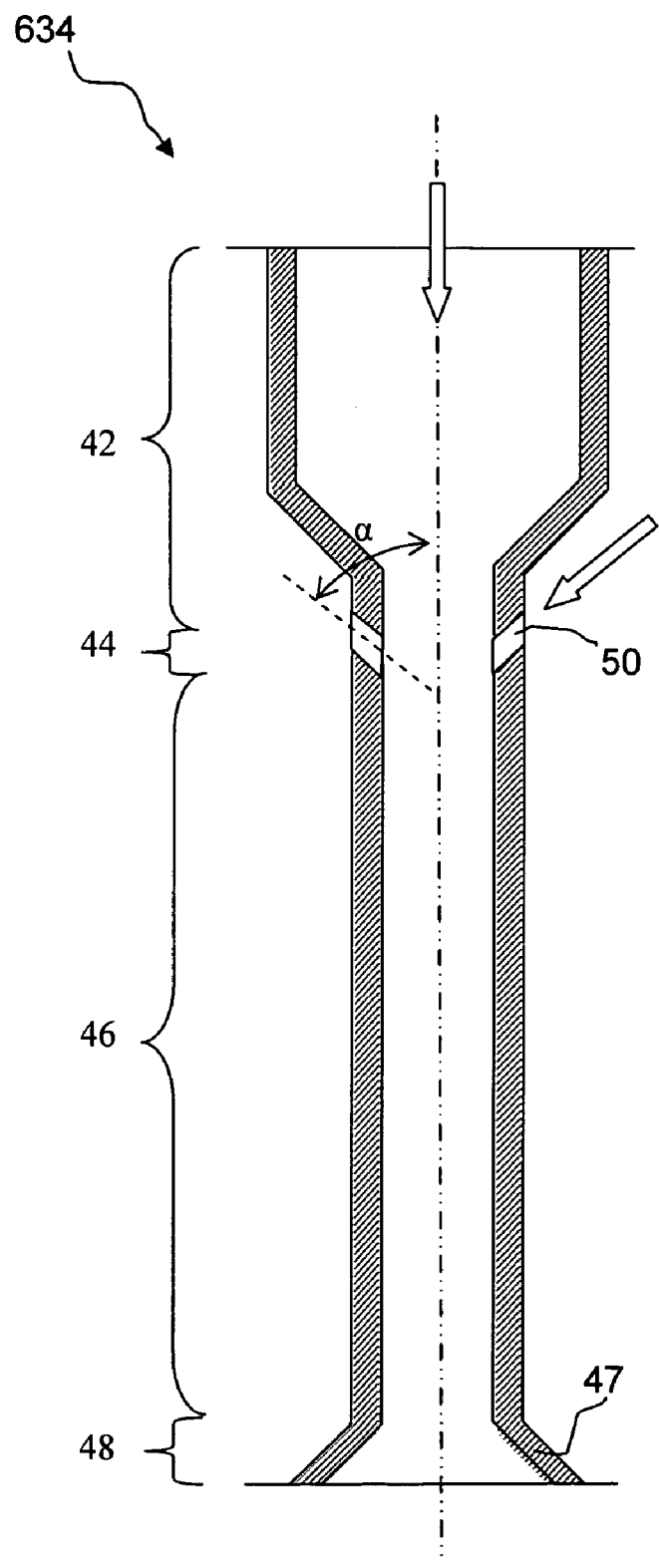
FIG. 9 represents an enlarged cross-section of a single channel designed in accordance with a seventh embodiment of the invention.

Still another channel design 634 is illustrated in FIG. 9. In this embodiment, inlets 50 are located downstream of a contracting-width section within first injection portion 42, with the result that the first feedgas linear velocity is already being increased before the second feedgas is injected into channel 634.

With respect to the channel description in FIGS. 4-9, the disclosed characteristics for channel 134 of FIG. 3, such as pertaining to the general direction of the gas flow in the channel, the measurement of mixing efficiency, the number of inlets 50 disposed through channel wall 51, the position of inlets 50 along wall 51, the angle $\alpha$ between axis 43 of first injection portion 42 and axis 52 of inlets 50, the composition of the internal surface of the channel exposed to either or both feedgases, the pressure drop across the channel, the total gas velocity of the feedgas mixture exiting the channel, the total gas velocity of the feedgases in mixing portion 46 of the channel, the compositions of the first and second feedgases injected inside the channel, the cross-sectional areas of first injection portion 42 and mixing portion 46, and the like are equally applicable to the other channel designs 234; 34; 334; 434; 534; 634 of FIG. 4-9 respectively.

Referring back to FIGS. 1 and 2, although channels 34 and 134 are illustrated in FIGS. 1 and 2 respectively, any channel design such as channel 134; 234; 334; 435; 535; 635 may be substituted in lieu of channel design 34 in reactor 10 of FIG. 1; and similarly, any channel design 34; 234; 334; 435; 535; 635 may be substituted in lieu of channel design 134 in reactor 110 of FIG. 2. In some embodiments, more than one channel design may be employed in the mixing system 18 of reactor 10 or 110 in FIGS. 1 and 2 respectively.

Referring again to FIGS. 1 and 2, chamber 22 is filled with the first feedgas. Chamber 22 is preferably large enough to ensure that the gas pressure at the inlet of each first feedgas inlet 26 of the plurality of channels is substantially the same. Alternatively, uniform inlet pressure may be achieved by other means, such as the use of multiple feed inlets 12 (not shown). Floor 24 of chamber 22 and floor 38 of chamber 32 can comprise any suitable material and/or coating which can sustain exposure to either or both of the two feedgases. Floor 24 may be constructed with stainless steel and coated on either sides with a metal alloy which is compatible to exposure to either feedgases or both feedgases. For the embodiment wherein the second feedgas comprises primarily diatomic oxygen (such as greater than 50% $O_2$), the surfaces of floor 24 and floor 38 exposed to the gas phase present in chamber 32 should at least be compatible to exposure of an $O_2$-rich environment. The surfaces of floors 24 and 38 which are exposed to $O_2$ can comprise an oxidation-resistant metal alloy such as some of the commercially available alloys under the tradenames of Inconel® and Monel® from Special Metals. For example, floor 24 may be constructed of stainless steel, and the surfaces of floor 24 which is exposed to the $O_2$-rich gas phase present in chamber 32 may be overlain, clad, metallurgically bonded or plated with a suitable metal alloy resistant to said $O_2$-rich environment. Alternatively, floor 24 and/or floor 38 may be constructed of one or more suitable metal alloys which are resistant to $O_2$-rich environments. In preferred embodiments, floor 24 comprises a non-porous non-permeable material so as to prevent mass transfer through floor 24 between chamber 22 and chamber 32. Additionally, floor 24 can provide a nonporous structure which supports the plurality of channels.

Inlets 50 for injecting the second feedgas and inlets 26 for injecting the first feedgas are preferably sized so as to maintain the momentum ratio between the second feedgas and the first feedgas between about 0.05 and about 1, preferably between about 0.1 and about 0.5; more preferably between about ⅛ and about ⅓; still more preferably between about ⅛ and about ⅙. The momentum of a feedgas is defined as its mass flow rate multiplied by its inlet linear velocity.

Because of the high degree of gas mixing within the present channels, post-mixing chamber 19 can be axially short and thus is preferably between about 1 and 25 cm long, more preferably between about 2 and 20 cm long, and still more preferably between about 3 and 10 cm long. In alternative embodiments, post-mixing chamber 19 is eliminated and is replaced with a packing refractory material in a portion of the reaction zone 20 upstream of a catalyst bed, so that packing refractory material is immediately downstream of channel outlets 36. Said packing refractory material could serve as a gas distributor to catalytic zone within reaction zone 20 and/or could serve as a heat shield to prevent radiated heat from catalytic bed from increasing the temperature of the mixed feed gases so as to prevent from reaching its autoignition temperature. In other embodiments, the mixed feed gases flow directly into the catalyst bed.

The housing 11 of reactor 10 or 110 of FIG. 1 or FIG. 2 (such as a reactor vessel) preferably has an internal diameter or internal characteristic width greater than about 30 centimeters, more preferably greater than about 0.5 meter, more preferably greater than about 1 meter, and still more preferably greater than about 1.5 meters. In some embodiments, reactor housing 11 has an internal characteristic width less than about 10 meters. In alternate embodiments, reactor housing 11 has an internal characteristic width greater less than about 5 meters. In some embodiments, reactor housing 11 is a cylindrical shaped reactor vessel with an internal between about 0.3 meter and about 10 meters. In alternate embodiments, the present reactor housing 11 has an internal diameter between about 0.5 meter and about 5 meters.

In preferred embodiments, reaction zone 20 comprises a catalyst bed comprising a solid monolith catalyst or a solid particulate catalyst. The term "monolith" as used herein is any singular piece of material of continuous manufacture such as solid pieces of metal or metal oxide or foam materials or honeycomb structures. Reaction zone 20 preferably comprises a packed bed of solid particulate catalyst. Downstream of the catalyst bed, optional additional catalyst beds (not shown) may be provided. If desired, a catalyst bed floor (not shown) may be positioned on the downstream side of the catalyst in order to retain the catalyst packed bed and may also serve to thermally insulate the reacted gases entering a cooling zone downstream of the catalyst bed. Any suitable or desired catalyst composition and construction such as are known in the art may be used in conjunction with the present invention. Preferably at least a majority (i.e., >50%) of the solid catalyst particles have a maximum characteristic length (i.e., longest dimension) of less than 20 millimeters, preferably less than 15 millimeters, more preferably less than 10 millimeters. According to some embodiments, the divided catalyst structures have a diameter or longest characteristic dimension of about 0.25 mm to 10 mm (about 0.01 inch to about 0.4 inch). In more preferred embodiments, the divided catalyst structures have a diameter or longest characteristic dimension in the range of about 1 mm to about 8 mm. In other embodiments, they are in the range of about 50 microns to 1 mm.

Alternatively or additionally, reaction zone 20 may comprise some non-catalytic packing material. The non-catalytic packing material may provide enhanced heat transfer throughout reaction zone 20. For example, one might select a composition for the non-catalytic packing material, which confers a high thermal conductivity (i.e., greater than 40 W/mK at 25° C.) to said non-catalytic packing material. The non-catalytic packing material in the form of solid particulate catalyst (such as particles, pellets, trilobes, and the like) may be mixed with, or sandwiched between layers of, a particulate catalytic material to form reaction zone 20. A non-catalytic packing material can provide a diluent for reaction zone 20 comprising particulate catalytic material. For example, a high thermal conductivity material with excellent thermal shock resistance to high temperatures (such as greater than 700° C.) may be used as the non-catalytic packing material or a portion of the non-catalytic packing material to dissipate the heat formed by the catalytic exothermic reaction in reaction zone 20, so as to minimize hot spots formation within reaction zone 20 and facilitate removal of produced heat. In some embodiments, reaction zone 20 may be substantially free of catalytic material but yet could comprise a non-catalytic packing material.

In some preferred embodiments, the solid particulate catalyst particles are spherical, cylindrical, or trilobic.

In some embodiments of the present invention, the ratio of the external surface area of the catalyst bed to the volume of the catalyst bed is greater than 20:1, and preferably greater than 60:1.

In some preferred embodiments, the solid particulate catalyst particles preferably comprise a partial oxidation catalyst suitable for converting a hydrocarbon gas with oxygen gas to a mixture of hydrogen and carbon monoxide (i.e., synthesis gas or syngas). The partial oxidation catalyst may comprise a group VIII metal, rhenium, or any combination thereof. The partial oxidation catalyst preferably comprises rhenium, iridium, palladium, rhodium, nickel or any combination of two or more thereof. The partial oxidation catalyst more preferably comprises rhodium, nickel, iridium, rhenium, or any combination thereof. Combinations may include alloys of these metals. The most preferred compositions for a partial oxidation catalyst for a gaseous hydrocarbon feed contains between about 0.5 wt % Rh and about 10 wt % Rh based on the total weight of the catalyst, more preferably between about 0.5 and about 5 wt % Rh The catalyst may further comprise a rare earth metal (such as a lanthanide), rare earth metal oxide, or a combination thereof. A "lanthanide" refers to a rare earth element selected from the group consisting of La, Ce, Pr, Nd, Pm, Sm, Eu, Gd, Tb, Dy, Ho, Er, Tm, Yb and Lu. The partial oxidation catalyst preferably comprises a lanthanide selected from the group consisting of lanthanum, samarium, praseodymium, neodymium; more preferably comprises samarium (Sm) and/or lanthanum (La). The lanthanide metal may be in an oxide form in the partial oxidation catalyst. The preferred compositions for a partial oxidation catalyst for light hydrocarbons further contain 0.5-10 wt % Sm or La, more preferably 2-8 wt % Sm or La. In certain preferred embodiments, the ratio of rhodium to lanthanide may be in the range of about 0.5:1 to about 2:1. The lanthanide in the partial oxidation catalyst may be in elemental form, but preferably in oxide form and/or in formed complexes such as with components of a support. The partial oxidation catalyst may further comprise a support on which the catalytic material is deposited. The support preferably comprises a refractory material, such as zirconia, alumina, cordierite, titania, mullite, lanthanide-stabilized alumina, MgO-stabilized zirconia, MgO-stabilized alumina, silicon carbide, silicon nitride, niobia, or any mixture thereof. The preferred compositions for a partial oxidation catalyst for hydrocarbon gas feed preferably contain an alumina-based refractory support. The support preferably has a BET surface area of at least 0.1 $m^2$/gram of support. In some embodiments, the BET surface area of the support is preferably between about 1 $m^2$/gram of support and about 50 $m^2$/gram. In alternate embodiments, the BET surface area of the support is between about 1 $m^2$/gram of support and about 20 $m^2$/gram. In some embodiments, the BET surface area of the support is preferably between about 0.5 $m^2$/gram of support and about 5 $m^2$/gram. In other embodiments, the BET surface area of the support is less than about 10 $m^2$/gram of support.

The solid particulate catalyst preferably has a BET surface area of less than about 20 $m^2$ per gram of catalyst ($m^2$/g cat), more preferably less than about 10 $m^2$/g cat, still more preferably less than about 5 $m^2$/g cat.

Suitable examples of catalysts and reaction conditions for partial oxidation systems to be employed in reaction zone 20 to form hydrogen and CO from catalytic partial oxidation of a hydrocarbon gas comprising methane are disclosed in U.S. Patent Publication No. 20020115730 to Allison et al.; in U.S. Pat. Nos. 6,402,989; 6,409,940; 6,461,539; 6,630,078; and 6,635,191; each of which is incorporated herein by reference in its entirety.

Operation

A preferred process for producing synthesis gas employs a monolithic or divided catalyst containing a catalyst composition that is effective for catalyzing the conversion of one gaseous hydrocarbon, such as any $C_1$-$C_5$ alkanes (e.g., methane) or any combination thereof (such as natural gas or mixtures of methane and ethane) and diatomic oxygen ($O_2$) to primarily CO and $H_2$ by a net catalytic partial oxidation (CPOX) reaction. Preferably employing a fast contact (i.e., millisecond range)/fast quench (i.e., less than one second) reactor assembly, a feed stream comprising a light hydrocarbon and an oxygen-containing gas is contacted with the catalyst. In certain embodiments of the process, the step of maintaining net partial oxidation reaction promoting conditions includes keeping the temperature of the feed stream at about 30° C.-750° C. and keeping the temperature of the catalyst at about 600-2,000° C., preferably between about 600-1,600° C., by self-sustaining reaction The reactor is preferably operated at a feed stream pressure greater than 1 atmosphere (>100 kPa), more preferably above 2 atmospheres (>200 kPa), which is advantageous for optimizing syngas production space-time yields. One suitable reaction regime is a fixed bed reaction regime, in which the catalyst is retained within a reaction zone in a fixed arrangement, as conceptually illustrated in FIGS. 1 and 2.

In operation, a stream of light hydrocarbon feedgas, such as comprising methane, other gaseous hydrocarbon gas (such as $C_2$-$C_5$ alkanes) or mixtures thereof (such as natural gas) is fed into first injection opening 12. Preferably, the light hydrocarbon feedgas is a methane-containing feedstock which comprises at least 80% methane, more preferably at least 90%. The light hydrocarbon feedgas may further comprise up to 15% ethane. An $O_2$-containing feedgas, such as air, oxygen gas ($O_2$), $O_2$-enriched air, or $O_2$ with a diluent gas such as nitrogen, is fed into second injection opening 14. In some embodiments, the $O_2$-containing feedgas consists essentially of $O_2$. In preferred embodiments, the $O_2$-containing feedgas is essentially free of $N_2$. The light hydrocarbon feedgas enters each channel (e.g., 34, 134, 243, 334, 434, 534 or 634) through opening 26, while the $O_2$-containing feedgas separately enters each channel through one or more inlets 50. The light hydrocarbon feedgas and the $O_2$-containing feedgas are mixed in mixing portion 46.

In some embodiments, the inlet temperature of the light hydrocarbon feedgas at first injection opening 12 is between ambient temperature and about 850° C. In other embodiments, the inlet temperature of the light hydrocarbon feedgas at first injection opening 12 is preferably between about 30° C. and about 750° C., more preferably between 100° C. and 600° C., still more preferably between about 200° C. and about 500° C., and still more preferably between about 250° C. and about 450° C. In some embodiments, the inlet temperature of the $O_2$-containing feedgas at second injection opening(s) 14 is between ambient temperature and about 300° C. In preferred embodiments, the inlet temperature of the $O_2$-containing feedgas at second injection opening(s) 14 is preferably between about 20° C. and about 250° C.; more preferably between about 20° C. and about 230° C. In alternate embodiments, the inlet temperature of the $O_2$-containing feedgas at second injection opening(s) 14 is between about 50° C. and about 200° C. In some embodiments, the inlet temperature of the $O_2$-containing feedgas at second injection opening(s) 14 is preferably at ambient temperature or at least in the vicinity of between 10° C. to about 40° C.; whereas the light hydrocarbon feedgas at first injection opening 12 is preheated so as to achieve a temperature of the mixture of the $O_2$-containing feedgas and light hydrocarbon feedgas between about 200° C. and about 500° C., preferably between about 250° C. and about 350° C., more preferably between about 250° C. and about 300° C.

It should be understood that the feedgas injection openings in the reactor, the feedgas chambers, and the channels can be configured differently from the configurations shown in the accompanying Figures without affecting the principles or operation of the process. In preferred embodiments, mixing of the gases occurs immediately before or during the contacting of the feed gas stream with the catalyst. Such configurations may help reduce the occurrence of unwanted reactions that might otherwise rapidly occur prematurely during or after mixing of $O_2$ with the hydrocarbon components but prior to contacting the catalyst within the reaction zone.

Air or a mixture of air and oxygen or a mixture of a diluent (such as nitrogen gas) and oxygen can be substituted for the pure oxygen. However, since the presence of $N_2$ in the reactant gas mixture can cause the formation of undesirable nitrogen-containing compounds, it is preferable in most cases to use substantially pure diatomic oxygen (e.g., more than 98 vol % $O_2$) instead of air (about 20-21 vol % $O_2$) or $O_2$-enriched air (e.g., more than 21 vol % $O_2$ but less than 100 vol % $O_2$). The hydrocarbon feedgas may be any gaseous hydrocarbon having a low boiling point, such as methane, natural gas, associated gas, or other sources of light hydrocarbons or alkanes having from 1 to 5 carbon atoms. The hydrocarbon feedgas may be a gas arising from naturally occurring reserves of methane. Preferably, the hydrocarbon feedgas comprises at least about 70% by volume methane, more preferably at least about 80% by volume methane.

The hydrocarbon feedgas may also include some steam and/or carbon dioxide ($CO_2$), as sometimes occurs in natural gas so that the feedgas mixture can also include steam and/or carbon dioxide ($CO_2$). In alternate embodiments, steam may also be added to one or both feed gases to produce extra hydrogen in reaction zone 20 and to control (i.e., reduce) the outlet temperature of the reaction zone 20. The steam can be added as an additional feed stream in the gas mixing apparatus, can be premixed with one of the feed gases upstream of the channels, or can be added separately, as desired. Regardless, it is preferred that the weight ratio of steam to carbon range in the resulting feedgas mixture is from 0 to 3:1, more preferably from 0 to about 1:1. In some embodiments, the molar ratio of steam to $O_2$ in the feedgas mixture is less than about 0.2:1, more preferably from 0 to about 0.1:1, still more preferably from 0 to about 0.05:1. In alternate embodiments, there is no steam addition to any of the feed gases. In some embodiments, the first and second feedgases are substantially free of water or steam (i.e., less than 1 vol % of water).

Under autothermal process conditions, there is no external heat source required to the partial oxidation reaction. The net partial oxidation reaction conditions are promoted by optimizing the concentrations of hydrocarbon and $O_2$ in the reactant gas mixture, preferably with a carbon:$O_2$ molar ratio in the range of from about 1.5:1 to about 3.3:1, preferably from about 1.7:1 to about 2.1:1; more preferably from about 1.9:1 to about 2.05:1.

Pressure, residence time, amount of feed preheat, and amount of dilution if used, also affect the reaction products. Suitable conversion promoting conditions in reaction zone 20 include a gas-phase temperature in the range of about 350° C.

to about 2,000° C., preferably in the range of 400° C. to 2,000° C., more preferably in the range of 700° C. to 1,600° C., still more preferably in the range of 800° C. to 1,600° C.; a pressure in the range of about 100 kPa to about 5,000 kPa (about 1-50 atm), preferably from about 200 kPa to about 4,000 kPa (about 2-40 atm); more preferably from about 200 kPa to about 3,500 kPa (about 2-35 atm); and a gas hourly space velocity (GHSV) in the range of about 20,000 to about 100,000,000 hr$^{-1}$, more preferably of about 50,000 to about 25,000,000 hr$^{-1}$, still more preferably of about 100,000 to about 10,000,000 hr$^{-1}$, yet still more preferably of about 200,000 to about 1,000,000 hr$^{-1}$, most preferably of about 400,000 to about 800,000 hr$^{-1}$, wherein "space velocity" as that term is customarily used in chemical process descriptions, and is typically expressed as volumetric gas hourly space velocity in units of hr$^{-1}$.

When employing either a monolith catalyst or a packed bed of divided catalyst particles, the surface area, depth of the catalyst bed, and gas flow rate (space velocity) are preferably chosen, or adjusted during operation, as applicable, so as to ensure the desired or optimal conversion efficiency and product selectivities. In preferred embodiments of the process, the catalyst system catalyzes the net partial oxidation of at least 80% conversion of a methane feedstock to CO and $H_2$ with a selectivity for CO and $H_2$ products of at least about 80% CO and 80% $H_2$; more preferably of at least 85% conversion of a methane feedstock to CO and $H_2$ with a selectivity for CO and $H_2$ products of at least about 85% CO and 85% $H_2$. In alternate embodiments of the process, the catalyst system catalyzes the net partial oxidation of at least 85% conversion of a methane feedstock to CO and $H_2$ with a selectivity for CO and $H_2$ products of at least about 90% CO and 90% $H_2$. Under other preferred CPOX promoting conditions with a methane feedgas, the net partial oxidation of at least 90% of the methane to CO and $H_2$ with a selectivity for CO and $H_2$ products of at least about 90% CO and 90% $H_2$ is achieved at or above 2 atmospheres of pressure and at GHSV of 50,000 h$^{-1}$ or more, preferably at or above 4 atmospheres of pressure and at GHSV of 200,000 h$^{-1}$ or more, more preferably at or above 7 atmospheres of pressure, and at GHSV of 4400,000 h$^{-1}$ or more.

The reactor system in which the present gas mixing apparatus is used can be operated with or without recycle. If present, the recycle line can be an additional feed into the channels directly and mixed with the reactor streams inside the gas mixer or it can be added to one of the feed streams upstream of the channels.

Table 1 gives exemplary ranges and preferred values for various operating parameters. It will be understood that none of the values given in Table 1 is intended as a limitation on the possible values of each parameter, which can be varied within any suitable operating range.

| Parameter | Exemplary Range | Preferred Range |
|---|---|---|
| C:$O_2$ | 1.5:1-3.3:1 | 1.7:1-2.1:1 |
| Methane molar fraction in gas mixture | 0.60-0.77 | 0.63-0.68 |
| Methane temperature at opening 12 (° C.) | 30° C.-750° C. | 200° C.-500° C. |
| Reactor Diameter (m) | 0.3-10 | 0.5-5 |
| $L_M$:$D_M$ ratio of mixing portion 46 (cm:cm) | >3:1 | >6:1 |
| Cross-sectional area of channel inlet (cm$^2$) | 20-325 | 45-125 |
| Cross-sectional area of mixing portion (cm$^2$) | 5-90 | 8-50 |
| Linear gas velocity in mixing portion (m/s) | >3 | 5-100 |
| Linear gas velocity entering zone 20 (m/sec) | >1 | 3-40 |

In preferred embodiments of the present invention, the hydrocarbon feed gas is a methane-containing feed. The methane-containing feed and the $O_2$-containing feed are mixed in such amounts as to give a carbon (e.g., carbon in methane) to diatomic oxygen molar ratio from about 1.5:1 to about 3.3:1, and more preferably from about 1.7:1 to about 2.1:1. The stoichiometric molar ratio of about 2:1 ($CH_4$:$O_2$) is especially desirable in obtaining a $H_2$:CO ratio of about 2:1 in the net partial oxidation reaction products. In some embodiments, the hydrocarbon feedgas is preferably preheated so as to obtain a feedgas mixture temperature that is at least 93° C. below the autoignition temperature of said feedgas mixture. In further embodiments, the hydrocarbon feedgas may be preheated to a temperature between 20-750° C., preferably 100-600° C., more preferably 200-500° C., and still more preferably 250-450° C.

During mixing, the feed gases may be shielded by a radiation barrier (not shown) from radiant heat that is generated downstream in reaction zone 20. It is preferred that the temperature on the upstream side of radiation barrier be in the range of about 30° C. to about 600° C., preferably no more than about 750° C., to help initiate the catalytic partial oxidation reaction (CPOX). Excessive preheating of the feed gases before entering the reaction zone 20 can cause unwanted homogeneous (i.e., gas phase) reactions to occur that reduce the selectivity of the process for the desired CO and $H_2$ products.

After the gases pass the radiation barrier, they come in contact with the reaction zone comprising a catalyst bed and are simultaneously heated to a gas temperature between 350° C. and 2,000° C., preferably not exceeding 1,500° C., more preferably being in the range of about 400° C. to about 1,200° C., and still more preferably being in the range of about 700° C. to about 1,050° C.

The preheated mixed feed gases pass over the catalyst to the point at which the partial oxidation reaction initiates, partially oxidizes at least a portion of one hydrocarbon with $O_2$ to form products and generate a product stream which exits reaction zone 20. An overall or net catalytic partial oxidation (CPOX) reaction ensues in reaction zone 20, and the reaction conditions are maintained to promote continuation of the process, which preferably is sustained autothermally. The term "autothermal" means that after initiation of the partial oxidation reaction, no additional or external heat must be supplied to the catalyst in order for the production of synthesis gas to continue. Under autothermal reaction conditions the hydrocarbon feed is partially oxidized and the heat produced by that exothermic reaction drives the continued net partial oxidation reaction. Consequently, under autothermal process conditions there is no external heat source required.

The gas flow rate is preferably maintained such that the contact time for each portion of the gas stream that contacts the catalyst is no more than about 200 milliseconds, more preferably under 50 milliseconds, and still more preferably 20 milliseconds or less. This degree of contact produces a favorable balance between competing reactions and produces sufficient heat to maintain the catalyst at the desired temperature. Exposure to the hot catalyst and oxygen partially oxidizes the light hydrocarbons in the feed according to the CPOX reaction (see Reaction 2, in the case of methane) and produces a product comprising hydrogen and carbon monoxide.

$$CH_4 + \tfrac{1}{2}O_2 \rightarrow CO + 2H_2 \quad (2)$$

It is preferred to keep the stoichiometric molar ratio of carbon:diatomic oxygen ($C:O_2$) at about 1.5:1 to 2.2:1, to favor the CPOX reaction. This is best accomplished by monitoring and adjusting during operation the composition, temperature, and flow rates of the feed gases, as further described below.

Competing reactions (e.g. combustion, coking) may occur, which can affect the CO and $H_2$ selectivities of the CPOX reaction. But, for example, by establishing and maintaining process conditions favoring CPOX over the catalyst, hydrocarbon combustion reaction (see Reaction 3, in the case of methane) resulting in the (undesirable) conversion of the hydrocarbon molecules to water and carbon dioxide ($CO_2$) is less likely to occur.

$$CH_4 + 2O_2 \rightarrow CO_2 + 2H_2O \quad (3)$$

In this way the $CO_2$ content of the product gases is minimized and the selectivity for CO and $H_2$ products is enhanced. In some embodiments, the product stream exiting the reaction zone 20 comprises less than 5% by volume of $CO_2$, preferably less than 3% by volume of $CO_2$, less than 1% by volume of $CO_2$. In additional or alternate embodiments, the product stream exiting the reaction zone 20 comprises less than 20% by volume of $H_2O$, preferably less than 15% by volume of $H_2O$, and more preferably less than 10% by volume of $H_2O$. In some embodiments, the product stream exiting the reaction zone 20 comprises more than 75% by volume of CO and $H_2$, preferably more than 80% by volume of CO and $H_2$, and more preferably more than 85% by volume of CO and $H_2$. In some situations it may be helpful to heat the catalyst using external means, at least at the start of the process, so as to facilitate initiation of the exothermic reactions on the catalyst structure. Once the process is commenced, depending on the nature of the reaction, it may be run adiabatically or nearly adiabatically (i.e., without loss of heat), so as to reduce the formation of carbon (e.g., coke) on the surface of the catalyst. The catalyst is preferably heated sufficiently as a result of the exothermic chemical reactions occurring at its surface to perpetuate the CPOX reaction under favorable conditions of reactant gas molar ratios, flow rate and catalyst contact time. Heating by external means, or otherwise adjusting the temperature toward the higher end of the preferred operating range (i.e., 400° C.-1,500° C.) can allow for increases in the rate at which feed gas can be passed through the catalyst structure while still obtaining desirable reaction products.

The hydrocarbon feedstock and the oxygen-containing gas may be passed over the catalyst at any of a variety of space velocities. Space velocities for the process, stated as gas hourly space velocity (GHSV), are in the range of about 20,000 to about 100,000,000 $h^{-1}$. Although for ease in comparison with prior art systems space velocities at standard conditions have been used to describe the present invention, it is well recognized in the art that residence time is the inverse of space velocity and that the disclosure of high space velocities corresponds to low residence times on the catalyst. "Space velocity," as that term is customarily used in chemical process descriptions, is typically expressed as volumetric gas hourly space velocity in units of $h^{-1}$. Under these operating conditions a flow rate of reactant gases is maintained sufficient to ensure a residence or dwell time of each portion of reactant gas mixture in contact with the catalyst of no more than 200 milliseconds, preferably less than 50 milliseconds, and still more preferably less than 20 milliseconds. A contact time of 10 milliseconds or less is highly preferred. The duration or degree of contact is preferably regulated so as to produce a favorable balance between competing reactions and to produce sufficient heat to maintain the catalyst at the desired temperature.

The process may be operated at atmospheric or superatmospheric pressures. The pressure may be in the range of about 100 kPa to about 32,000 kPa (about 1-320 atm), preferably from about 200 kPa to 10,000 kPa (about 2-100 atm). Alternatively, the pressure may be in the range of about 200 kPa to about 5,000 kPa (about 1-50 atm), preferably from about 200 kPa to 4,000 kPa (about 2-40 atm).

The process is preferably operated at a temperature in the range of about 350° C. to about 2,000° C., and preferably less than 1,500° C. More preferably, the temperature within reaction zone 20 is maintained in the range 400° C.-1,200° C., as measured at the reactor outlet.

The product stream emerging from reactor (10 or 10' from FIGS. 1A and 1B respectively) may be routed directly into any of a variety of applications, preferably at superatmospheric pressure. One such application for the product stream comprising CO and $H_2$ is for producing higher molecular weight hydrocarbon compounds using Fischer-Tropsch synthesis and/or for producing alcohols. For producing higher molecular weight hydrocarbon compounds and/or alcohols, the product stream comprising CO and $H_2$ can comprise a hydrogen-to-carbon monoxide molar ratio between about 1.4:1 and about 2.3:1, or alternatively between about 1.6:1 and about 2.1:1. In preferred embodiments, the product stream comprising CO and $H_2$ comprises a hydrogen-to-carbon monoxide molar ratio between about 1.4:1 and about 2:1; more preferably between about 1.6:1 and about 2:1.

The present invention has been disclosed in terms of its role in a catalytic partial oxidation process. It will be understood that the present invention has applicability in any catalytic reaction scheme, in which it is desired to mix or distribute reactants prior to contacting them with the catalyst, and particularly those reaction schemes in which it may be desired to heat or cool the reactant gases prior to contacting them with the catalyst. When one of the reactants is an oxygen-containing gas, exemplary reaction schemes include, in addition to partial oxidation of methane, oxidative dehydrogenation and catalytic partial oxidation of hydrogen sulfide.

While the preferred embodiments of the invention have been shown and described, modifications thereof can be made by one skilled in the art without departing from the scope of the invention. The embodiments described herein are exemplary only, and are not intended to be limiting. Accordingly, the scope of protection is not limited by the description set out above, but is only limited by the claims that follow, that scope including all equivalents of the subject matter of the claims. The disclosures of all patents, patent applications and publications cited herein are incorporated by reference. The discussion of certain references in the Description of Related Art, above, is not an admission that they are prior art to the present invention, especially any references that may have a publication date after the priority date of this application.

We claim:

1. A reactor system for partially oxidizing a feed gas comprising:
   a vessel having an upstream end and a downstream end;
   a catalyst-containing zone disposed within said downstream end of the vessel;

a gas mixing apparatus disposed within said upstream end of the vessel, said gas mixing apparatus comprising a plurality of channels, wherein each channel comprises a channel outlet in fluid communication with said catalyst-containing zone;

a first injection portion having a uniform internal cross-sectional area and a longitudinal axis, said first injection portion including a first gas inlet in fluid communication with a first gas feed, said first gas inlet being parallel to said longitudinal axis;

a second injection portion being downstream of said first injection portion and in fluid communication with said first injection portion, said second injection portion comprising a non-uniform cross-sectional area and at least one second gas inlet, the at least one second gas inlet having a flow axis that is inclined at an angle with respect to said longitudinal axis of said first injection portion, said angle being between 0 and 90 degrees, exclusive; and a mixing portion being downstream of the at least one second gas inlet, said mixing portion having a uniform internal cross-sectional area which is smaller than the uniform internal cross-sectional area of the first injection portion, and said mixing portion being in fluid communication with said second injection portion and said channel outlet.

2. The reactor system according to claim 1 wherein the flow axis of the at least one second gas inlet is inclined at an angle between 10 and 80 degrees with respect to the longitudinal axis of the first injection portion.

3. The reactor system according to claim 1 wherein the ratio of the uniform cross-sectional areas of the mixing portion to the uniform cross-sectional area of the first injection portion is between about 0.25 and about 1.

4. The reactor system according to claim 1 wherein the mixing portion is characterized by a width and a length, and wherein the mixing portion has a length-to-width greater than 3:1.

5. The reactor system according to claim 1 wherein each channel is configured to direct gas flow inside said channel from said first gas inlet to said channel outlet, and further wherein the non-uniform cross-sectional area of said second injection zone decreases in the direction of gas flow.

6. The reactor system according to claim 1 wherein said mixing portion is downstream of the at least one second gas inlets.

7. The reactor system according to claim 1 further including a first gas chamber in fluid communication with the first gas inlet of each channel.

8. The reactor system according to claim 1 further including a second gas chamber in fluid communication with the at least one second gas inlet of each channel.

9. The reactor system according to claim 1 wherein the plurality of channels of the gas mixing apparatus are supported in the vessel by a nonporous structure.

10. The reactor system according to claim 1 wherein the at least one second gas inlet is in fluid communication with a second gas feed, wherein each channel has an internal surface exposed to either or both of the first and second gas feeds, and further wherein the channel internal surface comprises a catalytically-inert material.

11. The reactor system according to claim 1 wherein the vessel has a diameter greater than 30 centimeters.

12. The reactor system according to claim 1, wherein the first injection zone of each channel has a uniform cross-sectional area between 20 cm$^2$ and 125 cm$^2$.

13. The reactor system according to claim 1, wherein the mixing zone of each channel has a uniform cross-sectional area between 8 cm$^2$ and 50 cm$^2$.

14. The reactor system according to claim 1 wherein the total gas velocity within the mixing portion is greater than about 3 m/sec.

15. The reactor system according to claim 1 wherein the ratio of the uniform cross-sectional area of said mixing portion to the uniform cross-sectional area of said first injection portion is between about 0.4 and about 0.65.

16. The reactor system according to claim 1 wherein the ratio of the uniform cross-sectional area of said mixing portion to the uniform cross-sectional area of said first injection portion is between about 0.5 and about 0.6.

17. The reactor system according to claim 1, further including a first gas chamber in fluid communication with the first gas inlets of the plurality of channels and having a floor;

a second gas chamber in fluid communication with the at least one second gas inlet of the plurality of channels and having a floor;

wherein each channel is anchored in place by the floor of said first gas chamber and by the floor of said second gas chamber.

18. A gas mixing apparatus, comprising:

a plurality of flow channels, each channel comprising:

a channel outlet;

a first injection portion having a uniform internal cross-sectional area, a longitudinal axis, and a first gas inlet that is parallel to the longitudinal axis;

a second injection portion being downstream of said first injection portion and in fluid communication with said first injection portion, said second injection portion comprising a non-uniform cross-sectional area, said second injection portion including a downstream end and at least one second gas inlet, each second gas inlet having a flow axis that is inclined at an angle with respect to the longitudinal axis of said first injection portion, wherein said angle is between 0 and 90 degrees, exclusive; and a mixing portion having a uniform internal cross-sectional area which is smaller than the uniform internal cross-sectional area of the first injection portion, said mixing portion being in fluid communication with the downstream end of said second injection portion of said channel and further being in fluid communication with said channel outlet.

19. The gas mixing apparatus according to claim 18 wherein the flow axis of the at least one second gas inlet is inclined at an angle between 10 and 80 degrees with respect to the longitudinal axis of said first injection portion.

20. The gas mixing apparatus according to claim 18 wherein the flow axis of the at least one second gas inlet is inclined at an angle between 30 and 60 degrees with respect to the longitudinal axis of said first injection portion.

21. The gas mixing apparatus according to claim 18 wherein the flow axis of the at least one second gas inlet is inclined at an angle between 35 and 55 degrees with respect to the longitudinal axis of said first injection portion.

22. The gas mixing apparatus according to claim 18 wherein the flow axis of the at least one second gas inlet is inclined at an angle between 40 and 50 degrees with respect to the longitudinal axis of said first injection portion.

23. The gas mixing apparatus according to claim 18 wherein the ratio of the uniform cross-sectional area of said mixing portion to the uniform cross-sectional area of said first injection portion is between about 0.25 and about 1.

24. The gas mixing apparatus according to claim 18 wherein the ratio of the uniform cross-sectional area of said mixing portion to the uniform cross-sectional area of said first injection portion is between about 0.4 and about 0.65.

25. The gas mixing apparatus according to claim 18 wherein the ratio of the uniform cross-sectional area of said mixing portion to the uniform cross-sectional area of said first injection portion is between about 0.5 and about 0.6.

26. The gas mixing apparatus according to claim 18 wherein each channel is configured to direct gas flow inside said channel from said first gas inlet to said channel outlet, and wherein the non-uniform cross-sectional area of the second injection portion of said channel decreases in the direction of gas flow.

27. The gas mixing apparatus according to claim 18 wherein said second injection portion of each channel has a truncated-conical shape, trapezoidal shape or truncated-pyramidal shape.

28. The gas mixing apparatus according to claim 18 wherein said mixing portion is downstream of the at least one second gas inlet.

29. The gas mixing apparatus according to claim 18 wherein the second injection portion comprises a plurality of second gas inlets.

30. The gas mixing apparatus according to claim 29 wherein the flow axes of said plurality of second gas inlets intersect within the mixing portion.

31. The gas mixing apparatus according to claim 29 wherein each channel comprises at least four (4) second gas inlets.

32. The gas mixing apparatus according to claim 29 wherein the plurality of second gas inlets are disposed on a channel wall and are uniformly spaced along a circumference of said channel wall.

33. The gas mixing apparatus according to claim 29 wherein the plurality of second gas inlets are disposed on a channel wall with the angles of their respective flow axes differing by not more than 10 degrees.

34. The gas mixing apparatus according to claim 18 wherein the first injection portion and the mixing portion are cylindrical.

35. The gas mixing apparatus according to claim 18 wherein the mixing portion is characterized by a width and a length, and has a length-to-width greater than 3:1.

36. The gas mixing apparatus according to claim 18 wherein the mixing portion is characterized by a width and a length, and has a length-to-width greater than 6:1.

37. The gas mixing apparatus according to claim 18 wherein said first gas inlet is in fluid communication with a first gas feed, wherein the at least one second gas inlet is in fluid communication with a second gas feed, and further wherein each channel has an internal surface exposed to either or both of the first and second gas feeds, and further wherein the exposed internal surface of each channel comprises a catalytically-inert material.

38. The gas mixing apparatus according to claim 37 wherein the catalytically-inert material comprises a material selected form the group consisting of alumina, silica, gold, copper, bronze, and any combination of two or more thereof.

39. The gas mixing apparatus according to claim 37 wherein the catalytically-inert material is overlain, clad, metallurgically bonded or plated on the channel internal surface.

40. The gas mixing apparatus according to claim 18 wherein each channel further includes an expanded-area portion in fluid communication with the mixing portion of said channel and located downstream of said mixing portion, said expanding portion comprising said channel outlet, said channel outlet comprising a larger cross-sectional area than the uniform cross-sectional area of said mixing zone.

41. The gas mixing apparatus according to claim 40 wherein the channel outlet has a cross-sectional area larger than the uniform cross-sectional area of said first injection portion.

42. The gas mixing apparatus according to claim 40 wherein the cross-sectional area of said channel outlet is equal to the uniform cross-sectional area of said first injection portion.

43. The gas mixing apparatus according to claim 18 further including a first gas chamber in fluid communication with the first gas inlet of each channel, and wherein the first gas inlet of a given channel allows passage of a first feedgas from said first gas chamber into said given channel.

44. The gas mixing apparatus according to claim 18 further including a second gas chamber in fluid communication with the at least one second gas inlet of each channel, and wherein the at least one second gas inlet of a given channel allows passage of a second feedgas from said second gas chamber into said given channel.

45. The gas mixing apparatus according to claim 18 further including
   a first gas chamber in fluid communication with the first gas inlets of the plurality of channels and having a floor;
   a second gas chamber in fluid communication with the at least one second gas inlets of the plurality of channels and having a floor;
   wherein each channel is anchored in place by the floor of said first gas chamber and by the floor of said second gas chamber.

46. The gas mixing apparatus according to claim 18 wherein the plurality of channels are provided with an internal surface comprising a material resistant to a temperature higher than 500° C. said resistant material comprising an alloy of nickel.

47. The gas mixing apparatus according to claim 18 wherein said second injection portion is frustoconical with said downstream end being in fluid communication with said mixing portion and wherein said second injection portion further comprises an upstream end being in fluid communication with said first injection portion, said frustoconical second injection portion having a smaller internal cross-sectional area at its downstream end than at its upstream end.

48. The gas mixing apparatus according to claim 18 wherein said first injection portion of each channel has a uniform cross-sectional area between about 20 $cm^2$ and about 325 $cm^2$.

49. The gas mixing apparatus according to claim 18 wherein said mixing portion of each channel has a uniform cross-sectional area between about 5 $cm^2$ and about 90 $cm^2$.

50. A method for partially oxidizing a hydrocarbon feed gas comprising:
   a) providing a reactor system including:
      a vessel having an upstream end and a downstream end;
      a catalyst-containing zone disposed within said downstream end of the vessel;
      a gas mixing apparatus disposed within said upstream end of the vessel, said gas mixing apparatus comprising a plurality of flow channels, wherein each channel comprises a channel outlet in fluid communication with said catalyst-containing zone, each channel further comprising:
         a first injection portion having a uniform internal cross-sectional area, a longitudinal axis, and a first gas inlet that is parallel to the longitudinal axis;

a second injection portion being downstream of said first injection portion and in fluid communication with said first injection portion, said second injection portion comprising a non-uniform cross-sectional area, said second injection portion including a downstream end and at least one second gas inlet, each second gas inlet having a flow axis that is inclined at an angle with respect to the longitudinal axis of said first injection portion, wherein said angle is between 0 and 90 degrees, exclusive; and a mixing portion having a uniform internal cross-sectional area which is smaller than the uniform cross-sectional area of the first injection portion, said mixing portion being in fluid communication with the downstream end of said second injection portion of said channel and further being in fluid communication with said channel outlet;

b) injecting a first feedgas comprising at least one hydrocarbon into said first injection portion via said first gas inlet;

c) separately injecting a second feedgas comprising diatomic oxygen into said second injection portion via the at least one second gas inlet;

d) passing the first and second feedgases through the mixing portion of the channel with a sufficient gas velocity to produce a feedgas mixture; and e) reacting the feedgas mixture in the catalyst-containing zone so as to produce a product stream.

51. The method according to claim 50 wherein the catalyst-containing zone includes a partial oxidation catalyst comprising rhodium, iridium, palladium, nickel or any combination of two or more thereof.

52. The method according to claim 50 wherein the catalyst-containing zone includes a packed bed of solid particulate catalyst.

53. The method according to claim 50 wherein the second feedgas comprises more than 50% by volume of diatomic oxygen.

54. The method according to claim 50 wherein the total gas velocity in the mixing portion of the channel is greater than 3 m/sec.

55. The method according to claim 50 wherein the first feedgas comprises at least about 80% by volume methane.

56. The method according to claim 50, further including preheating the first feedgas to a temperature between 25° C. and 700° C. before it is injected into the channel first injection portion.

57. The method according to claim 50 wherein the feedgas mixture has a temperature between 200° C. and 500° C.

58. The method according to claim 50 wherein the product stream comprises hydrogen and carbon monoxide.

59. The method according to claim 50 wherein each channel has an internal surface exposed to either or both of the first and second feedgases, and further wherein said channel internal surface comprises a catalytically-inert material.

* * * * *